United States Patent
Porras

(10) Patent No.: US 10,207,567 B2
(45) Date of Patent: Feb. 19, 2019

(54) HEATER CORE ISOLATION VALVE POSITION DETECTION

(71) Applicant: Ford Global Technologies, LLC, Dearborn, MI (US)

(72) Inventor: Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1070 days.

(21) Appl. No.: 13/787,900

(22) Filed: Mar. 7, 2013

(65) Prior Publication Data

US 2014/0110081 A1    Apr. 24, 2014

Related U.S. Application Data

(60) Provisional application No. 61/716,077, filed on Oct. 19, 2012.

(51) Int. Cl.
*B60H 1/00* (2006.01)
*F01P 11/04* (2006.01)
*B60H 1/03* (2006.01)

(52) U.S. Cl.
CPC ......... *B60H 1/00978* (2013.01); *B60H 1/004* (2013.01); *F01P 11/04* (2013.01); *B60H 1/034* (2013.01); *F01P 2060/08* (2013.01)

(58) Field of Classification Search
CPC .... B60H 1/00978; B60H 1/004; B60H 1/034; F01P 11/04; F01P 2060/08
USPC .......................................... 165/202, 11.1, 43
See application file for complete search history.

(56) References Cited

U.S. PATENT DOCUMENTS

| | | | | |
|---|---|---|---|---|
| 1,354,875 A | * | 10/1920 | Beimdiek | B60H 1/00978 200/84 R |
| 5,345,761 A | * | 9/1994 | King | B60L 1/12 60/274 |
| 5,675,080 A | * | 10/1997 | Wada | F01P 11/14 123/568.16 |

(Continued)

FOREIGN PATENT DOCUMENTS

| CN | 1727814 A | 2/2006 |
|---|---|---|
| KR | 0137791 B1 | 7/1998 |
| KR | 20090036825 A | 4/2009 |

OTHER PUBLICATIONS

Chinese Patent Office, First Office Action for the corresponding Chinese Patent Application No. 201310492045.0, dated Aug. 1, 2016.

*Primary Examiner* — Claire Rojohn, III
(74) *Attorney, Agent, or Firm* — David Kelley; Brooks Kushman P.C.

(57) ABSTRACT

A vehicle is disclosed that has multiple coolant paths selected by control of a three-way valve in which the position of the valve is detectable. A method for detecting the valve position during fault conditions is disclosed. The vehicle has a heating system that includes a first coolant loop with a heating source, a water pump, and a heater core. The heating system also has a second coolant loop that includes an engine and a second water pump, in addition to the elements of the first coolant loop. Temperature sensors are located in each coolant loop. A three-way valve fault is detected by monitoring the behavior of the temperature sensors in response to the position of the three-way valve and the status of the heating sources.

12 Claims, 3 Drawing Sheets

(56) References Cited

U.S. PATENT DOCUMENTS

| | | | | |
|---|---|---|---|---|
| 6,098,602 | A * | 8/2000 | Martin | F02D 41/0072 123/568.23 |
| 6,166,351 | A * | 12/2000 | Yamamoto | B60H 1/00064 219/202 |
| 6,182,445 | B1 * | 2/2001 | Yamazaki | F01N 3/0814 137/551 |
| 6,213,233 | B1 * | 4/2001 | Sonntag | B60H 1/004 123/142.5 R |
| 6,848,434 | B2 * | 2/2005 | Li | F02M 26/47 123/568.12 |
| 6,898,927 | B2 * | 5/2005 | Morinaga | F01N 3/2006 123/688 |
| 7,222,615 | B2 * | 5/2007 | Buck | F02B 29/0437 123/568.12 |
| 7,246,487 | B2 * | 7/2007 | Hara | B60H 1/025 60/285 |
| 7,775,268 | B2 * | 8/2010 | Sato | B60H 1/00892 123/41.1 |
| 8,336,291 | B2 * | 12/2012 | Hanari | F02B 39/16 60/274 |
| 8,959,904 | B2 * | 2/2015 | Porras | F01N 9/00 165/48.1 |
| 9,109,481 | B2 * | 8/2015 | Martin | F01N 9/00 |
| 9,121,316 | B2 * | 9/2015 | Gerges | F01N 5/02 |
| 9,259,990 | B2 * | 2/2016 | Ishii | B60H 1/034 |
| 9,404,409 | B2 * | 8/2016 | Pursifull | F01N 5/02 |
| 9,909,541 | B1 * | 3/2018 | Bevan | F02M 26/49 |
| 2001/0017110 | A1 * | 8/2001 | Ap | F01P 7/048 123/41.1 |
| 2003/0089119 | A1 * | 5/2003 | Pham | A47F 3/04 62/131 |
| 2003/0127528 | A1 * | 7/2003 | Sabhapathy | B60H 1/04 237/12.3 B |
| 2003/0159455 | A1 * | 8/2003 | Aikawa | B60H 1/005 62/225 |
| 2005/0247446 | A1 * | 11/2005 | Gawthrop | B60H 1/004 165/202 |
| 2005/0263275 | A1 * | 12/2005 | Salim | B60H 1/005 165/202 |
| 2006/0112679 | A1 * | 6/2006 | Kojima | F02D 41/0055 60/278 |
| 2008/0072611 | A1 * | 3/2008 | Ahmed | F25B 49/02 62/175 |
| 2008/0077260 | A1 * | 3/2008 | Porter | F25B 49/005 62/129 |
| 2008/0115487 | A1 * | 5/2008 | Harada | F01N 5/02 60/320 |
| 2008/0279721 | A1 * | 11/2008 | Weiss | A61L 2/208 422/29 |
| 2009/0139686 | A1 * | 6/2009 | Suzuki | B60K 6/445 165/42 |
| 2009/0151342 | A1 * | 6/2009 | Major | F02G 5/02 60/320 |
| 2009/0205588 | A1 * | 8/2009 | Bilezikjian | F01P 7/164 123/41.02 |
| 2009/0265086 | A1 * | 10/2009 | Iihoshi | F02D 41/064 701/113 |
| 2010/0058743 | A1 * | 3/2010 | Tsukada | F01N 3/0253 60/287 |
| 2010/0186684 | A1 * | 7/2010 | Utsuno | F01N 5/02 123/41.1 |
| 2010/0218916 | A1 * | 9/2010 | Miller | F01P 7/165 165/104.11 |
| 2011/0083426 | A1 * | 4/2011 | Ikemoto | F01N 3/043 60/286 |
| 2011/0088378 | A1 * | 4/2011 | Prior | F01M 5/001 60/320 |
| 2011/0088672 | A1 * | 4/2011 | Prior | F01N 5/02 123/568.12 |
| 2011/0100307 | A1 * | 5/2011 | Moffat | F01P 3/12 123/41.1 |
| 2011/0111920 | A1 * | 5/2011 | Gooden | F01M 5/001 477/98 |
| 2011/0126782 | A1 * | 6/2011 | Saele | B60H 1/00 123/41.1 |
| 2011/0197853 | A1 * | 8/2011 | Takeishi | F01N 5/02 123/406.45 |
| 2011/0226048 | A1 * | 9/2011 | Maier | H01M 8/04029 73/114.68 |
| 2011/0284309 | A1 * | 11/2011 | Gooden | B60H 1/14 180/339 |
| 2012/0180452 | A1 * | 7/2012 | Caine | B60H 1/025 60/273 |
| 2012/0215429 | A1 * | 8/2012 | Yumisashi | B60W 10/06 701/112 |
| 2012/0227685 | A1 * | 9/2012 | Ozawa | F01P 7/165 123/41.08 |
| 2013/0213600 | A1 * | 8/2013 | Saitoh | F01P 7/165 165/11.1 |
| 2014/0109872 | A1 * | 4/2014 | Porras | F01P 7/165 123/435 |
| 2014/0110081 | A1 * | 4/2014 | Porras | F01P 11/04 165/11.1 |
| 2015/0065026 | A1 * | 3/2015 | Dawson | B60H 1/00385 454/75 |
| 2015/0167519 | A1 * | 6/2015 | Gerges | F01N 5/02 165/104.19 |
| 2016/0160772 | A1 * | 6/2016 | Keating | F02M 26/49 701/108 |
| 2016/0341100 | A1 * | 11/2016 | Nagai | F01N 5/02 |

* cited by examiner

HEATER CORE ISOLATION VALVE POSITION DETECTION

CROSS-REFERENCE TO RELATED APPLICATION

This application claims the benefit of U.S. Provisional Application No. 61/716,077, filed Oct. 19, 2012, the disclosure of which is incorporated in its entirety by reference herein.

BACKGROUND

To provide passenger compartment comfort, vehicles have the capability to heat or cool the passenger compartment. Conventional vehicles use waste heat from the engine as the sole source of heating for the passenger compartment. With the advent of Battery Electric Vehicles (BEV), there is no longer any waste heat available so that other means of heating the passenger compartment are required. A typical BEV may use an electric heater to warm the passenger compartment. Similarly, Hybrid Electric Vehicles (HEV) pose different problems because the engine may not always be running and generating waste heat for use by the heating system. Plug-in Hybrid Electric Vehicles (PHEV) compound this issue by running with the engine off for significant periods of time. In order to provide optimal fuel economy benefits, it is desired to heat the passenger compartment without having to rely solely on engine waste heat.

In a heating system, there may be valves to alter the flow of coolant through the system. These valves may be activated via a controller to a desired position. During normal operation, the valve will actually be in the actuated position set by the controller. During fault conditions, the valve may be in a position other than what the controller has selected. It is desirable to detect these situations in order to ensure that the system operates in a manner consistent with the actual valve position.

SUMMARY

In an illustrative embodiment, a hybrid vehicle includes an engine, an electric heater, a heater core and a valve arranged to route coolant through at least one of the engine and the electric heater. The illustrative system also includes a controller configured to control a valve to route coolant through the engine and the heater core in response to a heat request. The illustrative system includes the capability to run a heater loop independent from the engine-radiator loop. The illustrative system may provide robust capability to provide heating despite the fault of some of the system components. The illustrative system may also provide modes of operation to improve the effectiveness of heating the passenger compartment. For example, the system may diagnose valve faults and operate the system in a manner consistent with the valve position.

A vehicle is disclosed including an engine, a heat exchanger or heater core, an electric heater and a valve system that can selectively direct coolant from the engine to the heat exchanger. The valve system is capable of detecting the position of the valve based on a temperature of coolant entering the heat exchanger and a temperature of coolant exiting the engine. The valve system can detect proper valve operation when the valve is positioned to fluidly isolate coolant exiting the engine from the heat exchanger when a temperature increase of the coolant entering the heat exchanger is greater than a temperature increase of the coolant exiting the engine while the electric heater is on and the engine is off. The proper valve position may be detected when the temperature increase of the coolant entering the heat exchanger is greater than a first threshold and the temperature increase of the coolant exiting the engine is less than a second threshold. The valve system can detect a faulted valve operation where the valve actually directs coolant from the engine to the heat exchanger when the valve is commanded to fluidly isolate coolant from the engine from the heat exchanger. The fault position may be detected when the temperature increase over time of the coolant entering the heat exchanger is less than a first threshold value or the temperature increase over time of the coolant exiting the engine is great than a second threshold value. The system may be configured to generate an output representing a fault in the valve position and store a diagnostic code.

In another embodiment, a vehicle is disclosed including an engine, a heat exchanger or heater core, an electric heater and a valve system that can selectively direct coolant from the engine to the electric heater. The valve system is capable of detecting the position of the valve based on a change in temperature over time of coolant exiting the electric heater and a change in temperature over time of coolant exiting the engine. The valve system may detect proper valve operation when the valve is positioned to fluidly isolate coolant from the engine from the electric heater when a change in temperature of the coolant exiting the electric heater is greater than a change in temperature of the coolant exiting the engine while the electric heater is on and the engine is off. The proper valve position may be detected when the change in temperature of the coolant exiting the electric heater is greater than a first threshold and the change in temperature of the coolant exiting the engine is less than a second threshold. The valve system may detect a faulted valve operation where the valve actually directs coolant from the engine to the electric heater when the valve is commanded to fluidly isolate coolant from the engine from the electric heater. The fault position may be detected when the change in temperature of the coolant exiting the electric heater is less than a first threshold value or the change in temperature of the coolant exiting the engine is greater than a second threshold value. The system may be configured to generate an output representing a fault in the valve position and store a diagnostic code.

A method for detecting a valve position is disclosed. The method comprises the steps of activating a pump, commanding the valve to direct coolant through a heating source and fluidly isolating the heating source from an engine, activating the heating source, and in response, outputting a signal indicative of a position of the valve based on a change in coolant temperature associated with the heating source and a change in coolant temperature associated with the engine when the engine is off. In one embodiment, the engine may be off for a predetermined period of time prior to detecting the position. The valve position is detected to be in a faulted position in which the valve directs coolant from the engine to the heating source when the change in temperature of coolant associated with the heating source is less than a first threshold or the change in temperature of coolant associated with the engine is greater than a second threshold. When the faulted position is detected, an output representing the fault may be generated. The valve position may be determined to be in a proper position in which the valve does not direct coolant from the engine to the heating source when the change in temperature of coolant associated with the heating source is greater than a first threshold and the change in temperature of coolant associated with the engine is less than a second threshold. In another possible embodiment, the valve position detection may be performed when a valve electrical fault has been detected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may have two or more propulsion devices, such as a first propulsion device and a second propulsion device. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an electric battery supplements an internal combustion engine and at least one electric machine to further gain increased mileage and reduced vehicle emissions. A PHEV uses a larger capacity battery than a standard hybrid vehicle, and it adds a capability to recharge the battery from an electric power grid, which supplies energy to an electrical outlet at a charging station. This further improves the overall vehicle system operating efficiency in an electric driving mode and in a hydrocarbon/electric blended driving mode.

Figure 1:
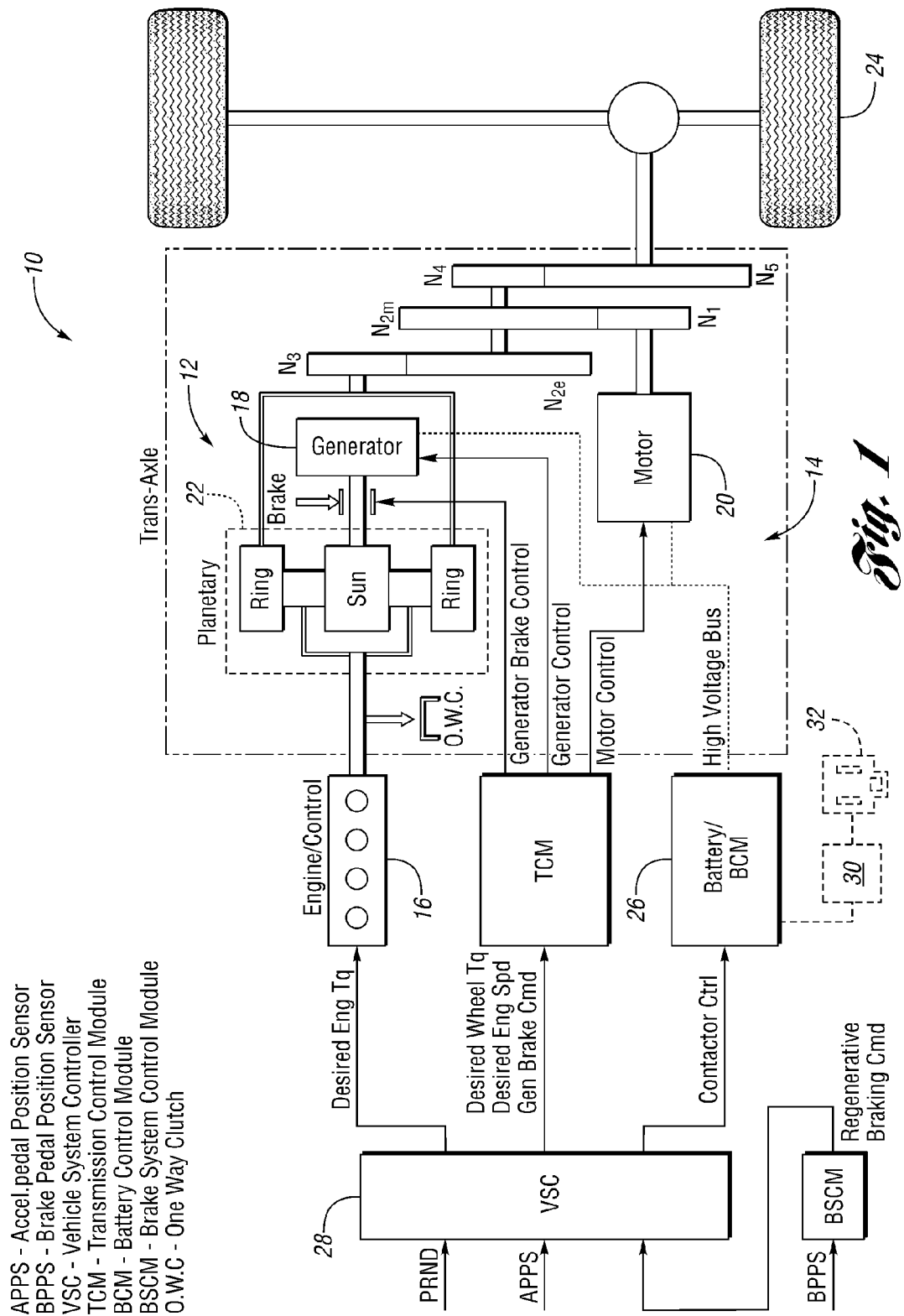
FIG. 1 is a schematic representation of a vehicle.

FIG. 1 illustrates an HEV 10 powertrain configuration and control system. A power split hybrid electric vehicle 10 may be a parallel hybrid electric vehicle. The HEV configuration as shown is for example purposes only and is not intended to be limiting as the present disclosure applies to HEVs, PHEVs or other vehicle types of any suitable architecture. In this powertrain configuration, there are two power sources 12, 14 that are connected to the driveline, which include a combination of engine and generator subsystems using a planetary gear set to connect to each other, and the electric drive system (motor, generator, and battery subsystems). The battery subsystem is an energy storage system for the generator and the motor. The charging generator speed will vary the engine output power split between an electrical path and a mechanical path. In a vehicle 10 with a power split powertrain system, unlike conventional vehicles, the engine 16 requires either the generator torque resulting from engine speed control or the generator brake torque to transmit its output power through both the electrical and mechanical paths (split modes) or through the all-mechanical path (parallel mode) to the drivetrain for forward motion. During operation using the second power source 14, the electric motor 20 draws power from the battery 26 and provides propulsion independently of the engine 16 for forward and reverse motions. This operating mode is called "electric drive" or electric-only mode or EV mode.

The operation of this power split powertrain system, unlike conventional powertrain systems, integrates the two power sources 12, 14 to work together seamlessly to meet the driver's demand without exceeding the system's limits (such as battery limits) while optimizing the total powertrain system efficiency and performance. Coordination control between the two power sources is needed. As shown in FIG. 1, there is a hierarchical vehicle system controller (VSC) 28 that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC 28 determines when and how much torque each power source needs to provide in order to meet the driver's torque demand and to achieve the operating point (torque and speed) of the engine.

The battery 26 is additionally rechargeable in a PHEV vehicle 10 configuration (shown in phantom), using a receptacle 32 which is connected to the power grid or other outside electrical power source and is coupled to battery 26, possibly through a battery charger/converter 30.

The vehicle 10 may be operated in electric mode (EV mode), where the battery 26 provides all of the power to the electric motor 20 to operate the vehicle 10. In addition to the benefit of saving fuel, operation in EV mode may enhance the ride comfort through lower noise and better driveability, e.g., smoother electric operation, lower noise, vibration, and harshness (NVH), and faster response. Operation in EV mode also benefits the environment with zero emissions from the vehicle during this mode.

A Plug-in Hybrid Electric Vehicle (PHEV) shares characteristics of both an ICE and a BEV. A PHEV may have some driving range in which propulsion is provided only by an electric motor 20 powered from a battery pack 26. Once the battery pack 26 charge has been depleted to a certain level, the engine 16 may be started. The engine 16 may provide power to propel the vehicle and to recharge the battery pack 26. In electric only mode, the engine 16 will not be running. Since the engine 16 is not running, there will be no engine heat generated that can be used for heating the passenger compartment. A PHEV may start the engine 16 in response to a need for passenger heating. This, however, interferes with the electric only operation and may impact fuel economy and emissions.

A PHEV may operate in different modes. In one mode, the PHEV may operate in a charge-sustaining mode. A charge-sustaining mode is one where the battery pack 26 state of charge is maintained within a certain range. This may be accomplished by running the engine 16 to power the generator 18 to recharge the battery pack. In another mode, the PHEV may operate in a charge-depleting mode. A charge-depleting mode is one where the battery pack 26 is allowed to discharge to a lower level. This may be in all-electric mode when the vehicle propulsion is provided by the electric motor 20 with power from the battery pack 26.

Figure 2:
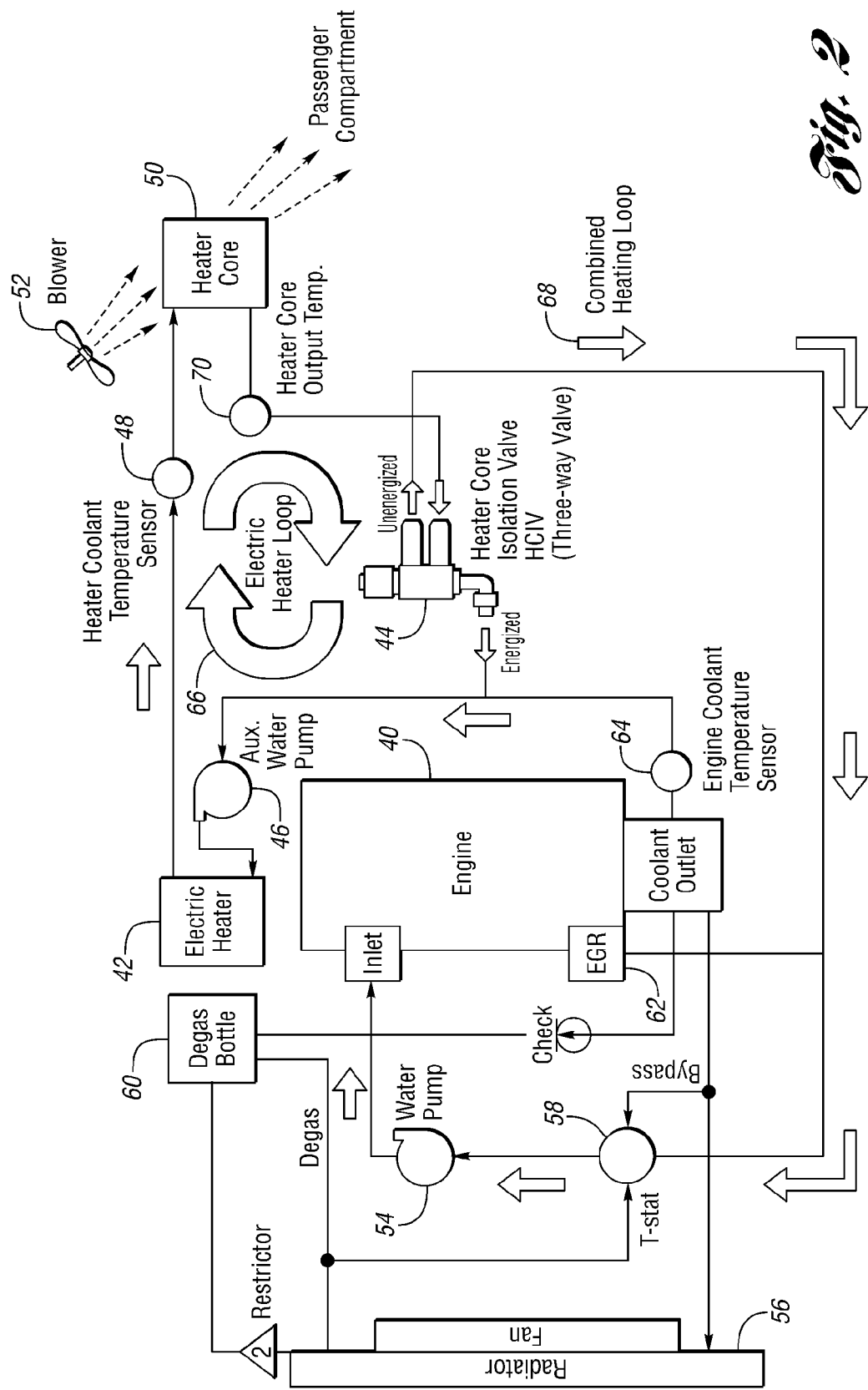
FIG. 2 is a schematic representation of vehicle components implementing a climate control strategy.

One possible system for providing passenger compartment heating for a PHEV is shown in FIG. 2. The system provides two sources of coolant heating. The system may utilize heat from the engine 40 to heat the coolant as in a conventional ICE vehicle. The system may also provide heat via an electric heater 42 as in a BEV system. Having multiple sources of heat allows flexibility during normal operating conditions and some redundancy during failure modes. The system allows the coolant from the different heat sources to flow through the heater core. The addition of a Heater Core Isolation Valve (HCIV) 44 allows the passenger heater system to select the source of heated coolant. A vehicle system control (VSC) module (28 FIG. 1) may control the operation of the system. The VSC (28 FIG. 1) may determine the heating mode based on the passenger-heating request and the status of the various components in the heating system. To ensure robust operation, the VSC (28 FIG. 1) may attempt to work with missing or failed control elements by choosing an appropriate operating mode.

The HCIV 44 may be used to activate different coolant loops. In one position, the HCIV 44 forms an electric-only heating loop 66. In this position, the coolant flows in a loop comprised of the HCIV 44, the auxiliary water pump 46, the electric heater 42, and the heater core 50, not limited to that particular order. In another position, the HCIV 44 forms a combined heating loop 68 that passes through the engine 40. In the combined heating loop, coolant flows through the HCIV 44, engine 40, water pump 54, thermostat 58, auxiliary water pump 46, electric heater 42, and heater core 50, not limited to that particular order. There is also a separate engine loop in which coolant flows through engine 40, water pump 54, thermostat 58, and the radiator 56, not necessarily in that order. Depending on the mode of operation, in order for coolant to flow in the system one or both of the pumps, 46 or 54, must be activated.

The system may also have an auxiliary water pump 46 to force coolant to flow through the system. A coolant sensor 48 may be included to measure the coolant temperature entering the heater core 50. The coolant flows through a heater core 50 that allows heat to be transferred from the coolant to air entering the passenger compartment. The heat may be transferred from the coolant in the heater core 50 using a blower 52 to pass air over the heater core 50 and into the passenger compartment.

The system may also have a water pump 54 to force coolant to flow through the engine 40. The water pump 54 may be mechanically or electrically driven. In certain modes, the water pump 54 may force coolant through the heater core 50 as well. The system may also have a radiator 56 to dissipate heat in the coolant. The system may also have a thermostat 58 to control the flow of coolant between the radiator 56 and the engine 40. The system may also have a degas bottle 60 that may act as a coolant reservoir, remove air from the coolant, and provide pressure relief. The cooling system may further include an exhaust gas recirculation (EGR) 62 system that recirculates a portion of the engine's exhaust gas back to the engine cylinders. In addition, the system may have an engine coolant temperature sensor 64 to determine the coolant temperature exiting the engine 40 or the engine coolant temperature exiting the engine may be estimated or inferred from other measurements.

The system has the capability to alter the flow of coolant through the system in response to the desired source of coolant heating. Based on the position of the HCIV 44, coolant may flow in different loops. Separate coolant temperatures may be achieved in each loop depending on the heating/cooling requirements of each loop at a particular time. The addition of the Heater Core Isolation Valve (HCIV) 44 allows the coolant flow to be modified. The HCIV 44 may be an electrically switched valve that alters the flow of coolant through the system. The HCIV 44 may be a three-way valve that allows one port to be alternately connected to each of the other two ports based on an activation signal. The HCIV 44 may allow the coolant loops to be combined as one larger coolant loop. The HCIV 44 may be switched in such a way to allow coolant to flow from the engine coolant loop through the HCIV 44 to the electric-only heater loop.

A controller may be used to actuate the HCIV 44. Depending on the design of the HCIV 44, it may or may not have feedback as to the actual position of the HCIV 44. It is desirable for the controller to know with some certainty that the HCIV 44 is in the correct position. The position of the HCIV 44 may be ascertained by observing the behavior of the system during operation.

An indirect method of determining the position of the HCIV 44 is possible using existing feedbacks in the system during known operating conditions. The method may first ascertain whether the conditions are correct for entering the HCIV position determination. The system may first determine if conditions are proper for determining the position by evaluating the entry conditions. The entry conditions to be evaluated may be as follows: the engine 40 is not running, the engine 40 has been off for a minimum required time, ambient temperature is above a minimum value, the blower 52 speed is below a threshold, the temperature sensors are functioning properly, the auxiliary water pump 46 is activated, the electric heater 42 is activated to heat the coolant, and the HCIV 44 has been actuated to the electric-only heating loop. Other entry criteria may include the detection of an open circuit or a short to ground of the HCIV 44 control lines. Depending on the particular HCIV 44, the diagnostic may be run only when a circuit fault has been detected. Other entry criteria may be used to determine when the diagnostic should be performed. The diagnostic may be run continuously when conditions are correct. If the entry conditions are not met, the system may continue to evaluate the entry criteria until they are met.

Once the entry conditions have been met, conditions may be examined to determine the position of the HCIV 44. The controller may make a measurement of the temperature sensor 48 in the electric-heater only loop and the temperature sensor 64 of the coolant at the engine outlet. The logic may be extended to any heating systems with independent heating loops that have different heating sources. The initial temperature values may be stored for later use. The controller may check to ensure that the entry conditions are still met. If the entry conditions are not met, the system may restart the procedure. If the entry conditions are met for a calibratable period of time, the final value of the temperature sensors 48 and 64 may be measured again. After the temperature values have been measured, the initial and final values can be compared to determine the position of the HCIV 44. A temperature rise in the coolant loop occurs when the difference between the final and initial temperature measurements are greater than a calibratable threshold. The temperature is flat if the difference between the final and initial temperature measurements are less than a calibratable threshold. The determination of a temperature rising or being flat may also allow for the change being within a predetermined percentage of allowable deviation from a calibrateable value The previous discussion uses temperature measurements at two separate times followed by a calculation of the temperature difference over that time. Alternatively, the two temperature sensor values may be integrated over time. After a certain time interval, the integrated values may be compared to calibratable thresholds to determine whether the temperature is rising or flat.

The entry conditions may be constructed so that a temperature rise is expected in the electric-only heater loop 66, while minimal change in temperature is expected at the engine coolant outlet. When the entry conditions are met, the temperature behaviors may be observed to determine if the expected behavior occurs. If the expected behavior occurs, then the valve may be confirmed to be in the correct position. When the electric-only heater loop 66 is enabled and the electric heater 42 is turned on, the temperature 48 in the electric-only heater loop 66 is expected to increase over time. When the engine 40 is not running, the temperature at the engine coolant outlet 64 is expected to remain flat or change slowly over time. If these conditions are observed, the HCIV 44 can be inferred to be in the correct position for the electric-only heating loop.

If the temperature in the electric-only heating loop rises and the temperature at the engine coolant outlet remains flat or changes slowly, then the controller may infer that the HCIV 44 is positioned in the electric-only heating loop 66. Any other measurement conditions may indicate that the HCIV 44 is not in the correct position. The controller may override the position to represent the actual position of the HCIV 44. Further control actions may utilize the predicted position of the HCIV 44.

Figure 3:
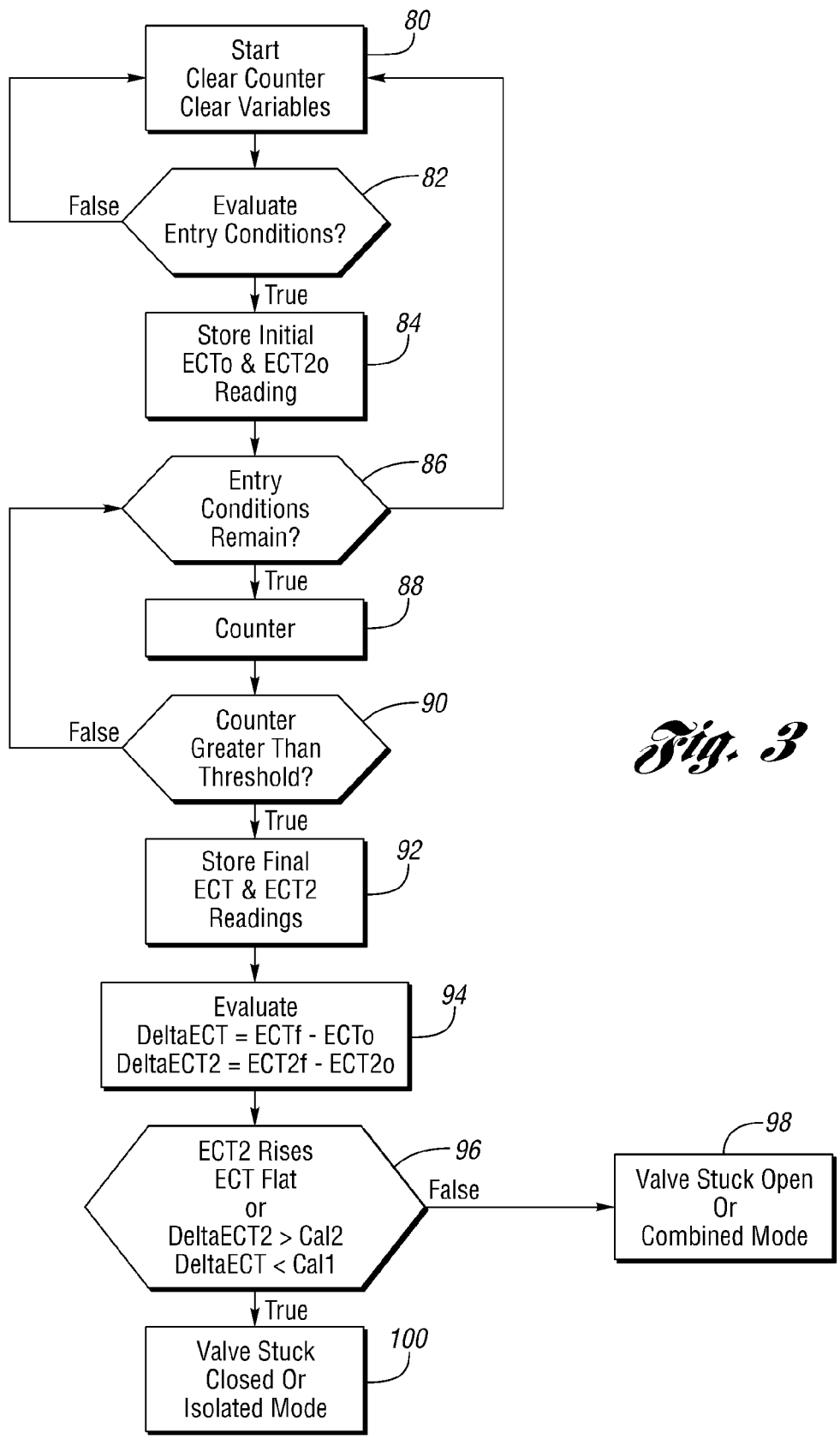
FIG. 3 is a flow chart of a valve position diagnostic.

FIG. 3 shows a flowchart of one possible embodiment of the HCIV position determination. This particular embodiment starts with the initialization of counters and variables 80. The entry conditions are then evaluated as described earlier 82. When the entry conditions are met, the initial temperature readings of each temperature sensor are stored 84. If the entry conditions are not met, the system returns to the initialization step 80. If the entry conditions are still present 86, a counter is incremented for each iteration of the control loop 88. When the counter is greater than a threshold 90, the final temperature readings of each temperature sensor are stored 92. The counter may represent the passage of a desired time. The change in temperature for each temperature sensor is then determined 94. Next, a determination of the behavior of each temperature sensor is performed 96. If the change in temperature of the electric-only heating loop is greater than a calibrated value and the change in temperature at the engine coolant outlet is less than another calibrated value, then the HCIV position is inferred to be in the proper position in the electric-only heating loop position 100. Any other result of the temperature change comparison means that the HCIV is likely faulted and in the combined heating loop position 98. Note that the change in temperatures may also be compared to be within a predetermined percentage of allowable deviation from the calibrateable value.

If the inferred position is not in the actuated position, the controller may set a fault code and store a diagnostic code. The controller may also use the inferred position to carry out the proper heating commands based on the position that the HCIV is in.

In this particular embodiment, the default position when not activated is in the combined heating loop. Assuming that applying power to the control line activates the valve, short circuits and open circuits may be detected by monitoring the control lines.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a valve configured to selectively direct coolant from an engine to a coolant loop including a heat exchanger and an electric heater; and
   a controller programmed to receive temperature data and, in response to commanding the valve to a position, identify the position based on a temperature of coolant entering the heat exchanger and a temperature of coolant exiting the engine.

2. The vehicle of claim 1 wherein the controller is further programmed to identify an isolated position in which the valve does not direct coolant from the engine to the coolant loop in response to a temperature increase of the coolant entering the heat exchanger being greater than a temperature increase of the coolant exiting the engine after commanding the valve to fluidly isolate the engine from the coolant loop while the electric heater is on and the engine is off.

3. The vehicle of claim 2 wherein the temperature increase of the coolant entering the heat exchanger is greater than a first threshold and the temperature increase of the coolant exiting the engine is less than a second threshold.

4. The vehicle of claim 1 wherein the controller is further programmed to identify a fault position in which the valve directs the coolant from the engine to the coolant loop in response to a temperature increase of the coolant entering the heat exchanger and a temperature increase of the coolant exiting the engine after commanding the valve to fluidly isolate the engine from the coolant loop while the electric heater is on and the engine is off.

5. The vehicle of claim 4 wherein controller is further programmed to identify the fault position in response to the temperature increase of the coolant entering the heat exchanger being less than a first threshold value or the temperature increase of the coolant exiting the engine being greater than a second threshold value.

6. The vehicle of claim 4 wherein the controller is further programmed to generate an output representing a fault in the position.

7. A vehicle comprising:
   a valve configured to selectively direct coolant from an engine to a coolant loop including an electric heater and a heat exchanger; and
   a controller programmed to receive temperature data and, in response to commanding the valve to a position, identify the position based on a change in temperature of coolant exiting the electric heater relative to a change in temperature of coolant exiting the engine.

8. The vehicle of claim 7 wherein the controller is further programmed to identify an isolated valve position in which the valve does not direct coolant from the engine to the coolant loop in response to a change in temperature of the coolant exiting the electric heater being greater than a change in temperature of the coolant exiting the engine after commanding the valve to fluidly isolate the engine from the coolant loop while the electric heater is on and the engine is off.

9. The vehicle of claim 8 wherein the change in temperature of the coolant exiting the electric heater is greater than a first threshold and the change in temperature of the coolant exiting the engine is less than a second threshold.

10. The vehicle of claim 7 wherein the controller is further programmed to identify a fault position in which the valve directs the coolant from the engine to the coolant loop in response to a change in temperature of the coolant exiting the electric heater and a change in temperature of the coolant exiting the engine after commanding the valve to fluidly isolate the engine from the coolant loop while the electric heater is on and the engine is off.

11. The vehicle of claim 10 wherein the fault position is identified in response to the change in temperature of the coolant exiting the electric heater being less than a first threshold value or the change in temperature of the coolant exiting the engine being greater than a second threshold value.

12. The vehicle of claim 10 wherein the controller is further programmed to generate an output representing a fault in the valve position.

* * * * *